Dec. 17, 1968  G. E. SUNDBLAD  3,417,234
RECORD READING APPARATUS AND METHOD
Filed June 27, 1967  4 Sheets-Sheet 1

INVENTOR
GUNNAR E. SUNDBLAD
BY
Mason, Kolehmainen, Rathburn and Wyss
ATTORNEYS.

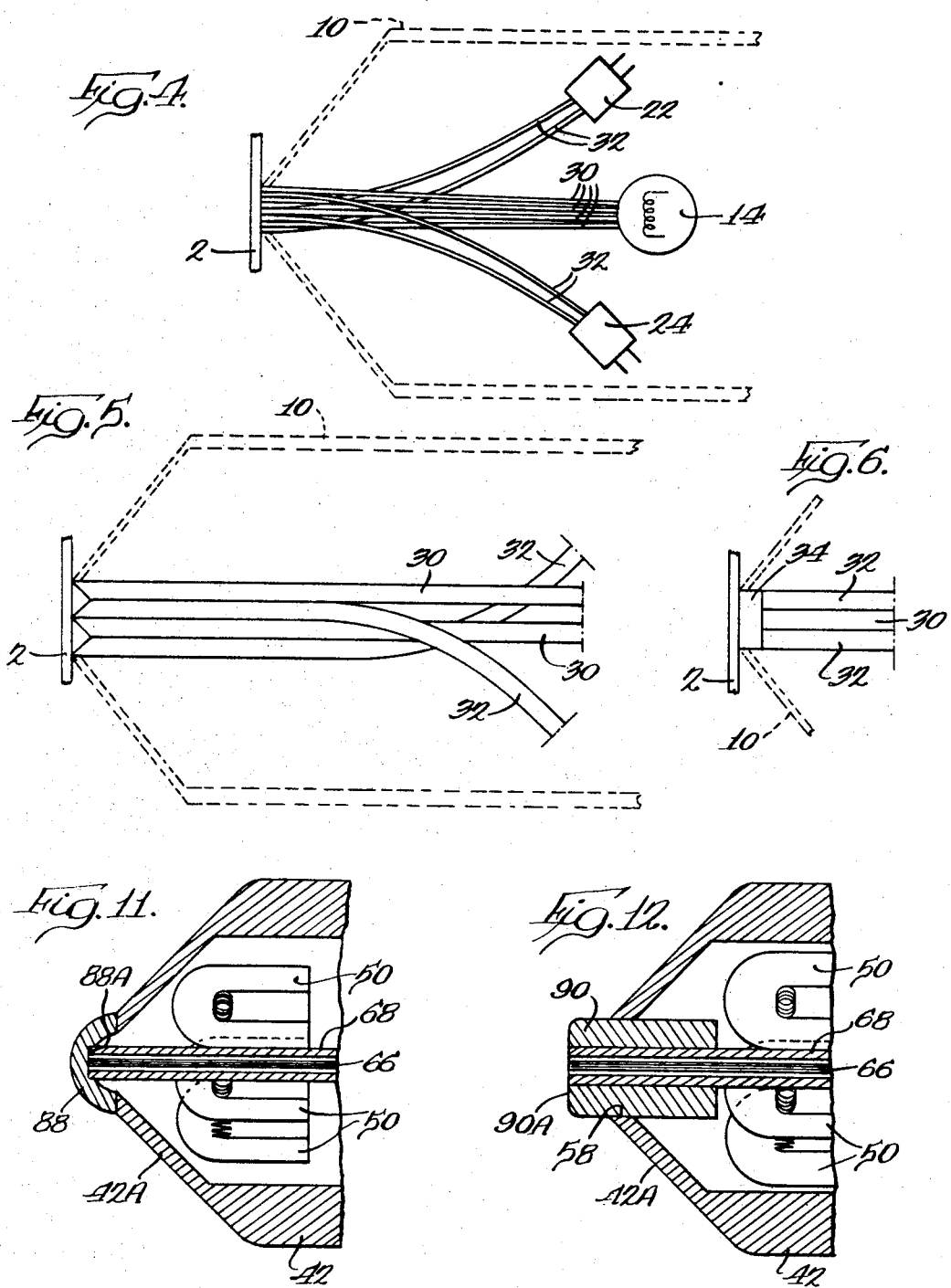

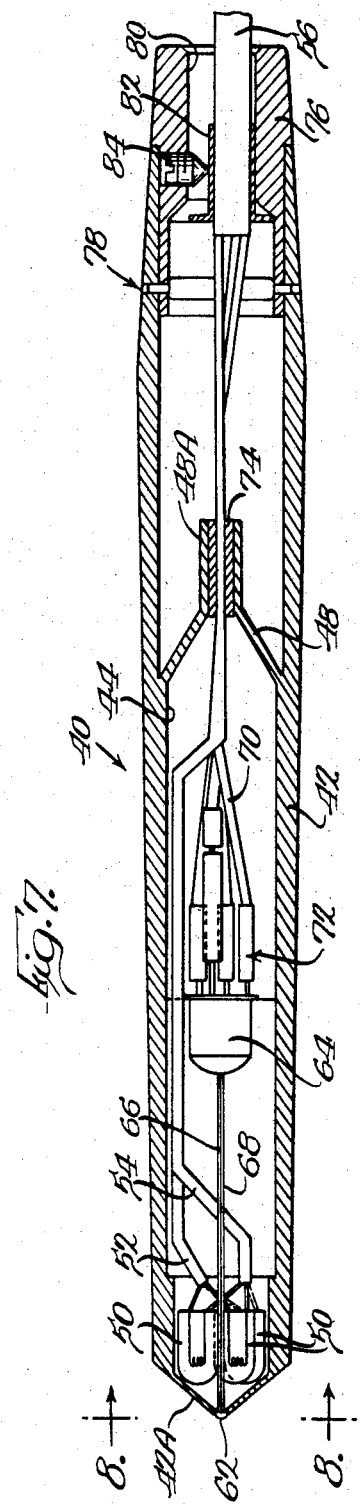
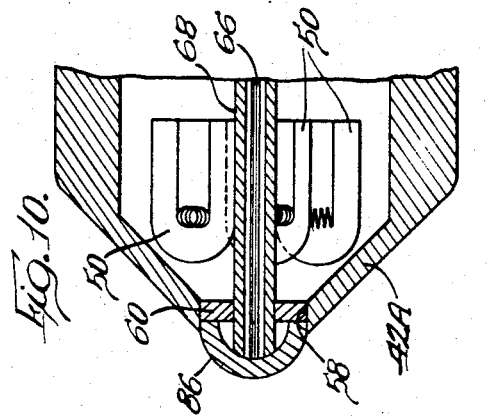
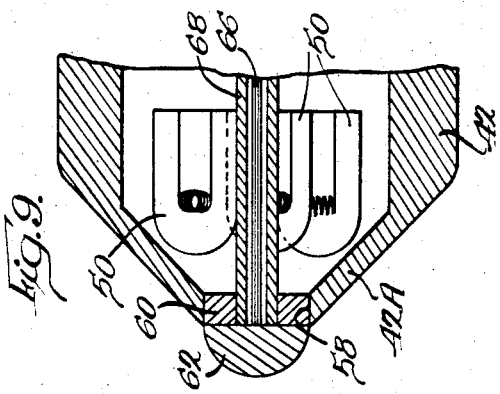
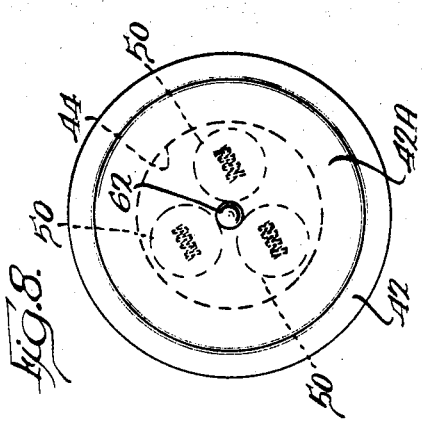

United States Patent Office 3,417,234
Patented Dec. 17, 1968

3,417,234
RECORD READING APPARATUS AND METHOD
Gunnar E. Sundblad, Bromma, Sweden, assignor to Svenska Dataregister AB, Solna, Sweden, a corporation of Sweden
Continuation-in-part of applications Ser. No. 288,997 and Ser. No. 289,103, both June 19, 1963. This application June 27, 1967, Ser. No. 654,944
Claims priority, application Sweden, June 21, 1962, 6,949 and 6,950
9 Claims. (Cl. 235—61.11)

ABSTRACT OF THE DISCLOSURE

A portable record reader and reading method for records coded with parallel and greatly elongated areas of different reflectivity. A hollow pencil-like housing with an opening in the tip contains an electric lamp and a photocell spaced along the housing axis. Optical rods extending generally along the axis of the housing and smaller than the opening extend between a light transmitting, record contacting element at the opening and the photocell to transmit reflected light. Incident light from the lamp passing through the element around the rods forms a scanning spot smaller than the widths of the code areas and permits the record to be correctly read if the operator wipes the tip across all of the coded area with the housing inclined at any angle to the record.

---

This application is a continuation-in-part of pending applications Ser. Nos. 288,997 and 289,103, both filed June 19, 1963, and now abandoned.

This invention relates to a record reading apparatus and, more particularly, to a new and improved portable record reader.

The reading and recording of price and other information in retail stores is a time consuming operation. As an example, the visual determination of prices and the subsequent manual entry of this information into a cash register in a grocery store consumes virtually half of the time expended by the cashier with each customer. In addition, taking inventory in retail and other stores requires a large expenditure of time that is largely consumed in determining the cost and designation of an article and entering it on a suitable record.

Attempts have been made in the past to provide records on the goods expressed in a coded form that can be automatically sensed and entered into an accounting machine. However, these records frequently require stationary reading apparatus or must be so fixed to the goods as to permit them to be at least partially inserted into a fixed or portable sensing unit. The prior records that can be permanently secured to the article generally must be uniplanar in configuration to permit the stored data to be sensed. Further, most of these prior records must be accurately aligned with the reading or sensing means to prevent incorrect record interpretation, and these locating means unduly increase the size and cost of the reading unit.

In a number of business machine applications in which data is recorded in coded, reproducible form, the quantity of data to be stored is so great that it is necessary to pack the recorded bits in as small an area as possible in order to reduce the length of record medium used. This packing is also necessary when a relatively large amount of data is to be recorded on other smaller records, such as price tags. The use of reflective surfaces of different characteristics selectively applied to the surface of the record permits a greater bit density than many other commonly used recording techniques, such as punching or perforating. These codes are subsequently sensed or read by optical systems responsive to light reflected from the record. To avoid false reading, it is necessary both to insure that the light reflected from one code area of the record is transmitted to a related one of the light responsive means and to prevent any substantial spreading of reflected light from a given area to responsive means assigned to or associated with adjacent code areas. This is not easily accomplished when the code areas are located closely adjacent each other.

Accordingly, one object of the present invention is to provide a new and improved record reader.

Another object is to provide a record reading means including new and improved optical sensing means.

Another object is to provide a record reading means adapted for use with price tags or other records that can be distorted to any form necessary to permit them to be permanently secured to an article or with records that can be formed directly on articles of any given shape or configuration.

Another object is to provide a record reading means including a light source and light responsive means selectively responsive to reflected light.

A further object is to provide new and improved means for coupling incident and reflected light between a record and a small, portable record reader containing an incident light source and a reflected light responsive means.

In accordance with these and many other objects, an embodiment of the invention comprises a housing, preferably portable in character, containing a light source for supplying a thin beam or spot of light that is directed out of the housing to impinge on a record to be read. The housing also includes light responsive means supplied with reflected light from the record and selectively responsive to the character of the reflected light for producing different control and data signals. The record reading or sensing means is adapted for use with a data record in which data is stored in the form of alternate nonreflective areas and light reflective areas, and, in a preferred embodiment, the reflective and nonreflective areas are formed as alternate parallel lines or bars extending substantially across the record element.

In order to reduce the size of the required code elements while insuring accurate reading and so as to make the reading unit as small as possible to permit easy use with one hand, it is desirable to provide as efficient a coupling as possible between the record and the light source and light responsive means in the housing. Accordingly, the reader includes optical fiber means for coupling one or both of these components to the record while permitting these components to be spaced from each other to reduce the width or diameter of the housing to something approximating that of a pen or pencil. Further, various arrangements are provided in or at an end opening in the housing for efficiently coupling the record to the components in the housing.

When the record is to be read or translated, relative movement is produced between the reading unit and the record so that the scanning beam or spot, which is smaller than or no greater than the width of the reflective and nonreflective areas, moves across the data bearing surface of the record in any unidirectional path intersecting all of the reflective and nonreflective areas. One light responsive means in the reading unit is controlled by light reflected from the reflective areas of either the first or the second characteristic to produce a series of steering or shift pulses to synchronize the storage of the data reproduced from the record. The other light responsive means is responsive to only reflected light of the second characteristic to provide a data or bit output pulse or signal which is stored under the control of the shifting or steering pulses produced by the other light responsive means. By this arrangement, there is no need to provide accurate alignment of the record with the sensing means, and the stored data is accurately reproduced merely by insuring that the scanning beam of the sensing device passes in a single direction along a path intersecting all of the reflective and non-reflective areas on the record.

Many other objects and embodiments of the present invention will become apparent from considering the following detailed description in conjunction with the drawings, in which:

FIG. 4 is a plan view illustrating the use of optical fibers in the record reading means;

FIG. 5 is an enlarged fragmentary view of another optical fiber and coupling arrangement for the reading means;

FIG. 6 is an enlarged fragmentary view of another embodiment of the optical fiber reading means;

FIG. 7 is a sectional view of another embodiment of the record reader;

FIG. 8 is an end elevational view of the reader taken in the direction of line 8—8 in FIG. 7;

FIG. 9 is an enlarged sectional view of the coupling arrangement used in the reader shown in FIG. 7; and FIGS. 10 to 12 are enlarged sectional views of various other arrangements for coupling the record reader and its components to a record.

Figures 1, 2:
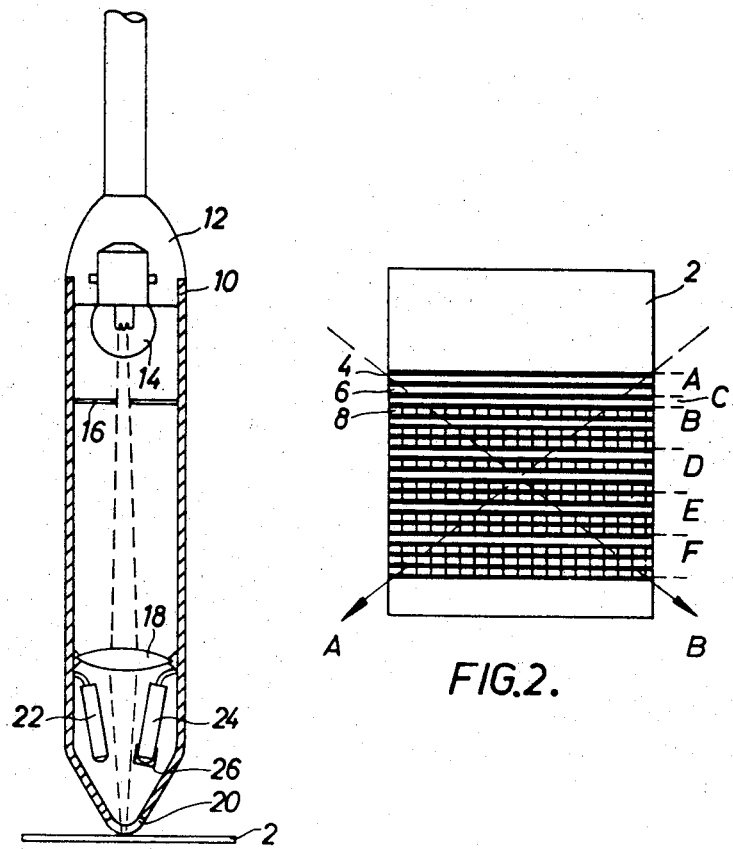
FIG. 1 is a sectional view of a record reading apparatus embodying the present invention.
FIG. 2 is a plan view of one type of record with which the sensing unit shown in FIG. 1 can be used.

FIG. 2 of the drawings illustrates one type of record with which the record reading apparatus is adapted to be used, and another such data record is shown and described in detail in my copending application Ser. No. 408,484, filed Nov. 3, 1964. The data record shown in FIG. 2 includes a record element 2 divided into a plurality of nonreflective areas 4 and reflective areas 6 and 8 having different or first and second light reflecting characteristics. In one embodiment, the nonreflecting areas 4 are printed on one surface of the record element 2 to define a plurality of intervening reflecting areas 6 of the first characteristic which comprises nothing more than the exposed upper surface of the record element 2. Data is recorded on the record element 2 by selectively applying material, such as red dye or ink, to selected ones of the areas 6 to convert them into the areas 8 having a different or second light reflecting characteristic.

In the record 2 illustrated in FIG. 2 of the drawings, the recorded data includes an article price item "1.25" and an article or department designation digit "2." More specifically, the nonreflective areas 4 and the plurality of intervening reflective areas 6 and 8 are divided into different fields to provide coded control and digital information. The three code fields indicated as F, E, and D each include four reflective areas 6 and 8 and provide binary representations of the price digits "1," "2," and "5," respectively. The field B also includes four reflective areas 6 and 8 and provides a binary coded representation of an identifying control or department digit "2." The field indicated as C comprises a single reflective area used for a parity check, and the field indicated as A includes two reflective areas 6 and provides a start code. In each of the areas B, D, E, and F, the four individual reflective areas considered in vertically descending order represent the binary values "1," "2," "4," and "8," respectively, and the reflective areas 6 represent the binary bit "1" while the reflective areas "8" represent a binary "0." If it is assumed that the control circuit with which the record element 2 is used is arranged for an even bit parity check, the single reflective area comprising the parity check field C formed by the reflective area 6 having the first characteristic represents the binary bit "1" to provide an even number of bits in the reproduced code.

The record reading or sensing device (FIG. 1) for reproducing the data stored on the record 2 comprises a housing 10 having an upper end opening closed by a member 12 on which a light source or electric lamp 14 is mounted. The light from the lamp 14 passes through a slotted plate 16 carried on the housing 10, and the beam produced thereby is focused by a lens 18 carried on the housing 10 to provide a scanning beam or spot which passes through a window or aperture 20 in the housing 10 to impinge on the record 2. This light is selectively reflected by the reflective areas 6 and 8 on the record 2 to supply reflected light of a first or second characteristic in dependence on the areas 6 and 8 from which the incident light is reflected.

The reflected light is applied to two light responsive means 22 and 24 which are mounted within the housing 10 and which are connected to external control circuits over a cable connected to the member 12. The light responsive means 22, which can comprise a photocell, produces an output pulse or signal when the incident light beam supplied by the lamp 14 is reflected from either of the reflective surfaces 6 and 8. The second light responsive means 24 is not responsive to light reflected from the areas 6 and produces an output signal only in response to light reflected from the area 8. If desired, the light responsive means 24 can comprise a photocell having a response to only light reflected from the area 8 and not from the area 6. Alternatively, the light responsive means 24 can be provided with a filter 26 to provide the desired response. As an example, if the areas 8 of the record 2 include a red coloring material, the light responsive means 24 can be provided with a green filter 26 to prevent its response to light reflected from the areas 6.

The reading or sensing unit illustrated in FIG. 1 can be formed as a stationary unit in combination with means for moving the record 2 relative thereto so that the beam of light from the lamp 14 scans the reflective and nonreflective areas on the record. However, in the preferred embodiment the reading device is formed with a cylindrical portable housing approximating the size of a fountain pen or pencil so that the reading unit can be moved relative to records 2 permanently fixed to articles or records stamped on articles, such as cans.

Figure 3:
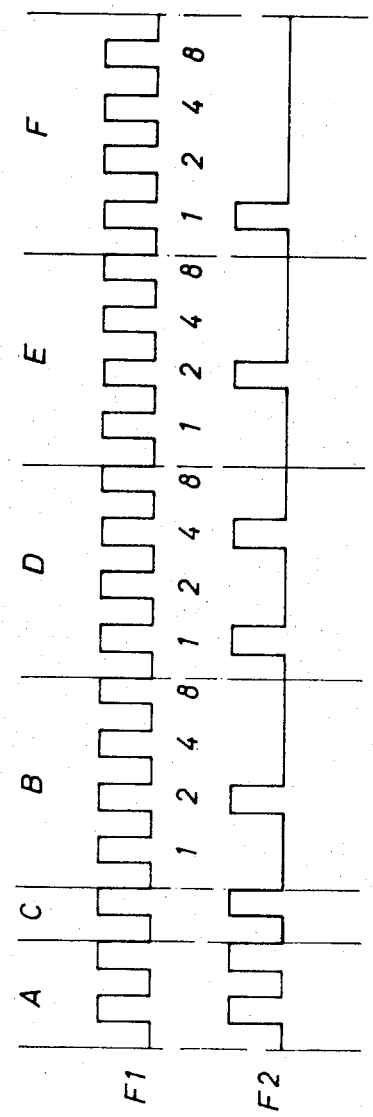
FIG. 3 is a schematic view illustrating waveforms produced by sensing the record shown in FIG. 2 with the reading unit shown in FIG. 1.

When the record 2 is to be read, this record and the reading instrument are moved relative to each other so that the beam or spot of light provided by the lamp 14 passes across each of the reflective areas 6 and 8 and each of the nonreflective areas 4 along any unidirectional path passing from the upper nonreflective area 4 to the lower nonreflective area 4. As an example, this relative movement can be along such diverse paths as the two indicated as A and B in FIG. 2. As the beam passes over the uppermost two nonreflective areas 4 and the uppermost two reflective areas 6, the light reflected from the areas 6 controls both of the light responsive means 22 and 24 to provide the two positive-going pulses in the field A illustrated in lines F1 and F2 of FIG. 3 of the drawings. The output pulses produced by the photocell 22 are illustrated in line F1 and the output pulses produced by the photocell 24 are illustrated in line F2. This code is recognized by the external register circuit to which the light responsive means 22 and 24 are connected as a start code and serves to condition the apparatus for receiving the following information reproduced from the record 2. This start code cannot be generated by moving the scanning beam upwardly relative to the record 2 in FIG. 2 because reflective areas 6 in the lowest two areas of the field F would represent a value "12" that is not used in a decimal system.

The beam next passes over the nonreflective area 4 and the reflective area 6 in the field C providing the parity check bit. Since the external control circuit is arranged for an even parity check and since five binary "1's" are provided in the data registered on the remaining fields of the ticket or record 2, the field C includes a reflective area 6 providing concurrent pulses at the output of both the light responsive means 22 and 24. The pulse provided by the light responsive means 22 steers the parity pulse provided by the photocell or light responsive means 24 to a suitable register therefor.

The light beam developed by the lamp 14 next passes over the reflective and nonreflective areas in the field B so that the photocell 22 which is responsive to light reflected from both of the areas 6 and 8 produces the four steering or shift pulses illustrated in line F1. During this movement, the photocell 24 responds to the single reflective area 6 in the field B to produce a single output pulse coinciding with the second shift pulse representing the binary value "2." Since this is the only bit pulse registered during this scanning operation, the value of the control or department digit stored in the field B is "2."

The light beam then passes over the reflective and nonreflective areas in the field D so that the photocell or light responsive means 22 produces four additional shift pulses for controlling and synchronizing the binary bit information supplied by the light responsive means 24. As illustrated in line F2, the two reflective areas 6 in this field control the light responsive means 24 to produce output signals representing the binary values "1" and "4." Thus, the value stored in the register as a result of scanning the field D is "5" or the third digit of the cost or price information. In a similar manner, scanning the remaining fields E and F controls the storage of the digits "2" and "1" in the external register in the manner described above.

Thus, the reading device, by including the means 22 and 24 responsive to reflected light of different characteristics, provides means for accurately storing binary coded information stored on the record 2 in correct order regardless of the precise path of relative movement between the record 2 and the sensing device. This is true insofar as the relative movement causes the scanning light beam to intersect each of the reflective and nonreflective areas on the record element. In addition, this reproduction is independent of both the speed of and changes in the speed of relative movement. Further, because the scanning beam or spot supplied by the lamp 14 is smaller or no greater than the width of the reflective and nonreflective areas 4, 6, and 8 and is extremely small compared to the transverse length of the areas 4, 6, and 8, a considerable degree of freedom in the path of relative movement between the record 2 and the scanning unit is afforded. These features permit the record 2 to be directly formed on or placed on a label applied to articles that are not uniplanar, such as the round wall of a can, and yet insure correct reproduction of the stored data.

In accordance with one feature of the present invention, the light source 14 and the light responsive means 22 and 24 are selectively coupled to the data bearing surface of the record 2 by a bundle or fascicle of light transmitting rods or optical fibers. The bundle of light transmitting rods, or fibers includes a plurality of fibers 30 that are used to transmit light from the source 14 to the data bearing surface of the record 2 and an additional plurality of fibers 32 that are used to transmit reflected light from the data bearing surface of the record 2 to the light responsive means 22 and 24. The bundle of fibers 30 and 32 can be formed of any suitable light transmitting or optical fiber material and is divergent at one outer end to permit the ends of the rods or fibers 30 and 32 to be disposed adjacent the light source 14 and the light responsive means 22 and 24 when disposed in physically spaced positions. The other end of the bundle converges to provide an end surface adapted to be disposed in proximity to the data bearing surface of the record 2. The arrangement of the fibers or rods 30 and 32 at the record engaging end is such that each code area on the record 12 is provided with at least one fiber 30 transmitting light from the source 14 and at least one fiber 32 for receiving reflected light.

If the optical reading system is to be used with the record of the type shown in FIG. 2 in which the coded areas can include material providing two distinct light reflecting characteristics, the record engaging end of the bundle of optical fibers is disposed adjacent a single code area. In this application, the light responsive means 22 and 24 individually respond to the different characteristics of the reflected light and are coupled to a single code area by the related groups of optical fibers 10. If desired, the light responsive means 22 and 24 can be provided with means, such as the filter 26, for rendering the means 22 and 24 individually responsive to the different light reflected by the code area on the record 2. However, in a preferred embodiment, the optical fibers 32 for the two responsive means 22 and 24 are formed with selective light transmission characteristics and serve not only as light transmitting means but also as filters.

In FIG. 4 of the drawings, the record engaging end of the bundle of optical fibers is formed as a plane or flat surface adapted to be placed in engagement with the code areas on the record 2 to insure proper transmission of the incident light supplied by the light source 14 and to prevent spreading of the reflected light. Another embodiment of the end structure of the bundle of optical fibers is illustrated in FIG. 5 of the drawings. The optical fibers or rods 30 for supplying incident light energy from the source 14 are formed with inwardly tapered ends and are paired with the oppositely tapered ends of the optical fibers or rods 32 for receiving reflected light and for transmitting it to the light responsive means 22 and 24. With the construction shown in FIG. 5, the uppermost optical fiber 30 supplies incident light energy which is selectively reflected off the code areas to be transmitted by the optical rod 32 extending downwardly and to the right to the light responsive means 24. The tapered end of the lower optical rod 30 supplies refracted light for reflection from the code surface which is received by the inclined or tapered end of the lower optical fiber 32 for transmission to the light responsive means 22.

FIG. 6 of the drawings illustrates another embodiment of the structure of the bundle of optical fibers. In this construction, the fibers 30 and 32 are provided with flush or plane end surface to which a thin disk or block of light transmitting material 34 is secured. The centrally disposed fiber or rod 30 supplies incident light energy which is transmitted through the disk 34 to be applied to the code area on the record 2. The light selectively reflected from the code area is received by the optical fibers 32 by transmission through the disk or block 34 and is subsequently coupled to the light responsive elements 22 and 24.

FIGS. 7, 8, and 9 of the drawings illustrate a record reader or record reader unit 40 which forms another embodiment of the invention and which is particularly adapted to translate or read the record shown in the above-identified copending application. The reader 40 includes a generally hollow, cylindrical, and elongated housing 42 defining a pair of interior cavities 44 and 46 separated by a generally transverse wall section 48. One end of the housing 42 is provided with a tapered, inclined, or conical portion 42A which permits the reader 40 to be placed adjacent the record 2 at various degrees of inclination relative to the record so as to facilitate easy manual relative movement of the reader 40 relative to the record 2 even when the record 2 is not uniplanar.

To provide means for illuminating the record 2 with incident light, the reader 40 includes a light source comprising a plurality of electric lamps such as three electric lamps 50 (FIGS. 7 and 8). These lamps are mounted in one end of the cavity 44 immediately adjacent the end portion 42A. The lamps 50 are energized from an external power source over a pair of conductors 52 and 54 which extend through the cavities 44 and 46 and form a part of a cable 56 extending to the remote equipment with which the reader 40 is associated. The lamps 50 provide illumination in any suitable spectrum within the range of the light responsive means used in the reader 40.

To provide means for coupling light from the lamps 50 to the record 2, the end portion 42A of the housing 42 includes a generally centrally disposed and circular opening 58 (FIG. 9) disposed generally on the axis of elongation of the housing 42. The diameter of the opening 58 can be on the order of 1 mm. and, with the record shown in the copending application Ser. No. 408,484, preferably is no greater than the widths of the parallel coded areas of the record. An annular light transmitting member 60 is secured and supported within the opening 58 and is secured to and supports a generally semispherical light transmitting member 62 along its lower planar surface. The member 62 can be, for instance, similar to a ruby jewel or bearing for a time movement. Incident light from the lamps 50 is collected by the light transmitting members 60 and 62 as a somewhat annular beam and directed on the record 2. The semispherical configuration of the member 62 which bears against the surface of the record 2 coupled with the tapered or inclined end portion 42A of the housing 42 permits the reader 40 to be held against the record 2 at various positions of inclination while maintaining efficient coupling from the lamps 50 to the record.

The light reflected from the record 2 is detected by a light responsive means or photocell 64. The photocell 64 is disposed within the cavity 44 spaced from the tapered end 42A of the housing 42. The photocell 64 is optically coupled to the record by means of a bundle or fascicle of optical rods or fibers 66 (FIGS. 7 and 9) which extends between the photocell 64 and the light transmitting coupling member 62. To protect, shield, and support the fibers or rods 66, the optical fibers or rods 66 are enclosed within an opaque sleeve or tube 68 which may be formed of metal and which extends between the coupling member 62 and the light responsive means 64. The use of the optical rods or fibers 66 permits the photocell 64 to be spaced away from the light source 50 in a position substantially aligned therewith so as to reduce the diameter of the elongated housing 42 and, in conjunction with the coupling member 62, provides efficient coupling between the record 2 and the photocell 64. The curved or semispherical configuration of the coupling member 62, as set forth above, permits the reader 40 to be disposed at a wide range of degrees of inclination relative to the record 2 during scanning and yet, in all of these positions, insures good optical coupling between the lamps 50, the record 2, and the optical rods or fibers 66 so that light is directed on and reflected from the record 2 and is collected and transmitted over the rods or fibers 66 to the photocell 64.

The photocell 64 is connected to external control apparatus over a plurality of conductors 70 which form a part of the cable 56. The photocell 64 can be directly coupled to the external apparatus, although a group of associated electrical components indicated generally as 72 can be connected to and associated with the photocell 64 and disposed within the cavity 44 of the housing 42 for the reader 40. In some instances, it may be desirable to include among the components 72 an amplifier or coupling stage interconnecting the photocell 64 with the external apparatus. Further, and although the reader 40 is shown as including only a single photocell 64, a plurality or a pair of such light responsive means similar to the means 22 and 24 shown in FIG. 1 responsive to reflected light of the same or different characteristics can be provided. It is possible to provide further light sensitive means because of the efficient coupling provided by the reader 40 and the flexibility in the positioning of the parts within the housing 42 without sacrificing the desired pen or pencil-like shape of this housing.

To provide a light-tight or sealed arrangement for the cavity or chamber 44, the transverse wall 48 is provided. A portion 48A of this wall is formed as a tubular sleeve through which the conductors 52, 54, and 70 pass. A resilient sleeve 74 is disposed within the opening of the sleeve 48A surrounding the conductors to provide a light-tight seal for the cavity 44.

The upper end of the housnig 42 forming one end of the cavity 46 is closed by an end member 76 which is detachably mounted on the housing 42 by the latching means indicated generally as 78. The cable 56 passes through an axial opening 80 in the closure or end part 76 and is received within a strain relief member 82. The strain relief member is secured to the end part 76 by a set screw 84 which is threadedly mounted in the part 76 and bears against the strain relief member 82.

The reader 40 can be used to translate or read records of the type described above merely by producing relative movement between the record or label and the reader 40 in such a manner that the coupling member 62 passes or slides across all of the coded areas, as illustrated schematically in FIG. 2 of the drawings by the lines A and B. As an example, if the reader 40 is used in conjunction with a record of the type shown, for instance, in the copending Sundblad application, Ser. No. 408,484, the coupling member 60 is placed against the record, and relative movement between the record and the reader 40 is produced to cause the coupling member 62 to move across or intersect each of the parallel areas. The light supplied by the lamps 50 passes through the members 60 and 62 to provide a uniform high intensity source or ring of light surrounding the fibers 66 that is selectively reflected off the reflective and nonreflective areas. The reflected light is returned to the coupling member 62 and passes through the light fibers or rods 66 to be supplied to the light sensitive means or light responsive means 64. During this relative movement the reader 40 can be placed at any angle relative to the record since the coupling member 62 insures adequate optical coupling of the light source 50 and the light sensitive means 64 to the record in all of these various positions.

FIG. 10 of the drawings illustrates a modified coupling structure in which a hollow, semispherical member 86 is provided which permits the lower end of the optical fibers 66 and the surrounding tube 68 to move into more immediate proximity to the record. In the arrangement shown in FIG. 11, the member 60 is removed and a somewhat hollowed semispherical member 88 provides the sole means for transmitting light between the record and the reader 40, both incident and reflected. The member 88 includes a well 88A for receiving and locating the lower ends of the protecting sleeve 68 and the optical rods or fibers 66. The arrangements shown in FIGS. 10 and 11 permit the same freedom of movement and positioning of the reader 40 relative to the record 2 as the embodiments shown in FIGS. 7–9.

In the modified coupling arrangement illustrated in FIG. 12, a hollow cylinder 90 of light transmitting material is disposed within the end opening 58 in a tapered end portion 42A of the housing 42. The member 90 serves to collect, transmit, and direct incident light energy on the record derived from the lamps 50. In this embodiment, the lower end of the protecting tube or sleeve 68 and the lower ends of the optical rods or fibers 66 extend to a position flush with the lower surface of the member 90 and are adapted to directly engage the record element.

Although the present invention has been described with reference to a number of illustrative embodiments thereof, it should be understood that numerous other modifications and embodiments can be devised by those skilled in the art that will fall within the spirit and scope of the principles of this invention.

What is claimed and desired to be secured by Letters Patent of the United States is:

1. A portable data reading instrument adapted to read information on a record medium in the form of areas of different reflectivity comprising
- a generally elongated housing of a size adapted to be held in one hand and defining an elongated inner chamber, said housing having a tapered end portion terminating in a point in which is formed an opening communicating with the inner chamber in the housing, the dimension of the opening measured transverse to the direction of elongation of the housing being much less than the dimension of the inner chamber measured above the tapered end portion and in a direction transverse to the direction of elongation of the housing, the opening affording a light transmitting path between the inner chamber and the exterior of the housing,
- light responsive means disposed within the chamber,
- light source means disposed within the chamber,
- means for mounting the light source means and the light responsive means within the chamber in axially spaced relation,
- and elongated optical fiber means extending generally along the axis of the housing and having a transverse dimension less than the transverse dimension of the opening, said optical fiber means being disposed with one end at the opening and the other end adjacent the light responsive means, the light source means including a plurality of lamps disposed around the optical fiber means adjacent the tapered end of the housing and intermediate the ends of the optical fiber means.

2. The portable data reading instrument set forth in claim 1 including
- a generally hemispherical member of light transmitting material mounted on the housing closing the opening and adapted to engage the record and couple light between the housing and the record while permitting the housing to be held at various angles relative to the record.

3. The portable data reading instrument set forth in claim 1 including
- a tubular member extending from the light responsive means toward the opening and enclosing the optical fiber means along at least a portion of its length.

4. A portable data reading instrument adapted to read information on a record medium in the form of areas of different reflectivity comprising
- a generally elongated housing of a size adapted to be held in one hand and defining an elongated inner chamber, said housing having a tapered end portion terminating in a point in which is formed an opening communicating with the inner chamber in the housing, the dimension of the opening measured transverse to the direction of elongation of the housing being much less than the dimension of the inner chamber measured above the tapered end portion and in a direction transverse to the direction of elongation of the housing, the opening affording a light transmitting path between the inner chamber and the exterior of the housing,
- light responsive means disposed within the chamber,
- light source means disposed within the chamber,
- means for mounting the light source means and the light responsive means within the chamber in axially spaced relation,
- a block of light transmitting material in the opening adapted to engage the record and providing a means for transmitting light between the record and the chamber,
- and an elongated optical fiber means having one end disposed at the light responsive means and its other end at the block of light transmitting material, the transverse dimension of the optical fiber means being substantially less than said dimension of the opening, the end of the optical fiber means disposed at the block of light transmitting material being located substantially centrally with regard to the opening in the housing to permit light from the light source to pass around the optical fiber means on all sides to be selectively reflected back from the record to the centrally disposed optical fiber means.

5. The portable data reading instrument set forth in claim 4 in which
- the light source is located adjacent the tapered end portion of the housing surrounding the optical fiber means.

6. A portable record reading instrument for use with a record having parallel, elongated areas of different reflectivity and no greater than a given width, comprising
- an elongated housing defining an inner chamber and having a generally conical or tapered end portion in which is formed an opening located generally on the axis of elongation of the housing and having dimensions measured transverse to said axis no greater than said given width,
- an element of light transmitting material located at the opening and adapted to engage the record,
- light responsive means mounted in the chamber spaced above the end portion,
- an elongated optical fiber means coupled at one end to the light responsive means and coupled to the element of light transmitting material at its other end, said other end of the optical fiber means being generally centrally disposed relative to the opening to receive light reflected from the record, the optical fiber means having a transverse dimension that is small compared to the transverse dimension of the opening and extending generally axially relative to the elongated housing,
- and a plurality of lamps disposed in the chamber between the end portion and the light responsive means and surrounding the optical fiber means.

7. The portable record reading instrument set forth in claim 6 in which
- the opening and the element are both substantially circular,
- and the end of the optical fiber means coupled to the element is located at the center of the block to permit light from the lamps to pass around the optical fiber means on all sides to impinge on the record.

8. A portable record reading instrument for use with a record having parallel, elongated areas of different reflectivity and no greater than a given width, comprising
- an elongated housing defining an inner chamber and having a generally conical or tapered end portion in which is formed a generally circular opening located generally on the axis of elongation of the housing and having a diameter no greater than said given width,
- a circular element of light transmitting material located at the opening and adapted to engage the record,
- light responsive means mounted in the chamber spaced above the end portion,
- an elongated optical fiber means coupled at one end to the light responsive means and coupled to the element of light transmitting material at its other end, said other end of the optical fiber means being generally centrally disposed relative to the opening to receive light reflected from the record, the optical fiber means having a transverse dimension that is small compared to the diameter of the opening and extending generally axially relative to the elongated housing,
- and a light source disposed in the chamber providing a ring of light surrounding the optical fiber means and directed out of the housing through the light transmitting element to illuminate the record.

9. A portable data reading instrument adapted to read information on a record medium in the form of areas of different reflectivity comprising a generally elongated housing of a size adapted to be held in one hand and defining an elongated inner chamber, said housing having a tapered end portion terminating in a generally rounded tip in which tip is formed a generally centrally disposed opening communicating with the inner chamber in the housing, the dimension of the opening measured transverse to the direction of elongation of the housing being much less than the dimension of the inner chamber measured above the tapered end portion and in a direction transverse to the direction or axis of elongation of the housing, the opening affording a light transmitting path between the inner chamber and the exterior of the housing, said opening lying on said axis of elongation of the housing, light responsive means disposed within the chamber, light source means disposed within the chamber, the light source means and the light responsive means being mounted within the chamber in axially spaced relation, and a light transmitting assembly carried on the housing for transmitting light to the record from the light source means and transmitting light reflected from the record to the light responsive means, said light transmitting assembly including a light transmitting member carried on the housing in a position closing the opening and adapted to engage the record, said light transmitting assembly also including an elongated optical fiber means disposed in the housing generally along the axis of elongation thereof and having an end adjacent and generally centrally located relative to the light transmitting member, the transverse dimension of the optical fiber means being substantially less than said transverse dimension of the opening to provide a central light transmitting path and another light transmitting path between the edge of the opening and the central path for coupling the record to the light responsive and light source means in the housing when the housing is moved to different inclined positions relative to the record on said rounded tip.

References Cited

UNITED STATES PATENTS

| | | | |
|---|---|---|---|
| 2,420,716 | 5/1947 | Morton et al. | 235—61.11 |
| 2,899,132 | 8/1959 | Orthuber | 235—61.6 |
| 3,229,075 | 3/1962 | Palti | 235—61.11 |

DARYL W. COOK, *Primary Examiner.*